(No Model.)
2 Sheets—Sheet 1.
G. H. BURLEY.
VALVE FOR STEAM ENGINES.
No. 281,665.   Patented July 24, 1883.
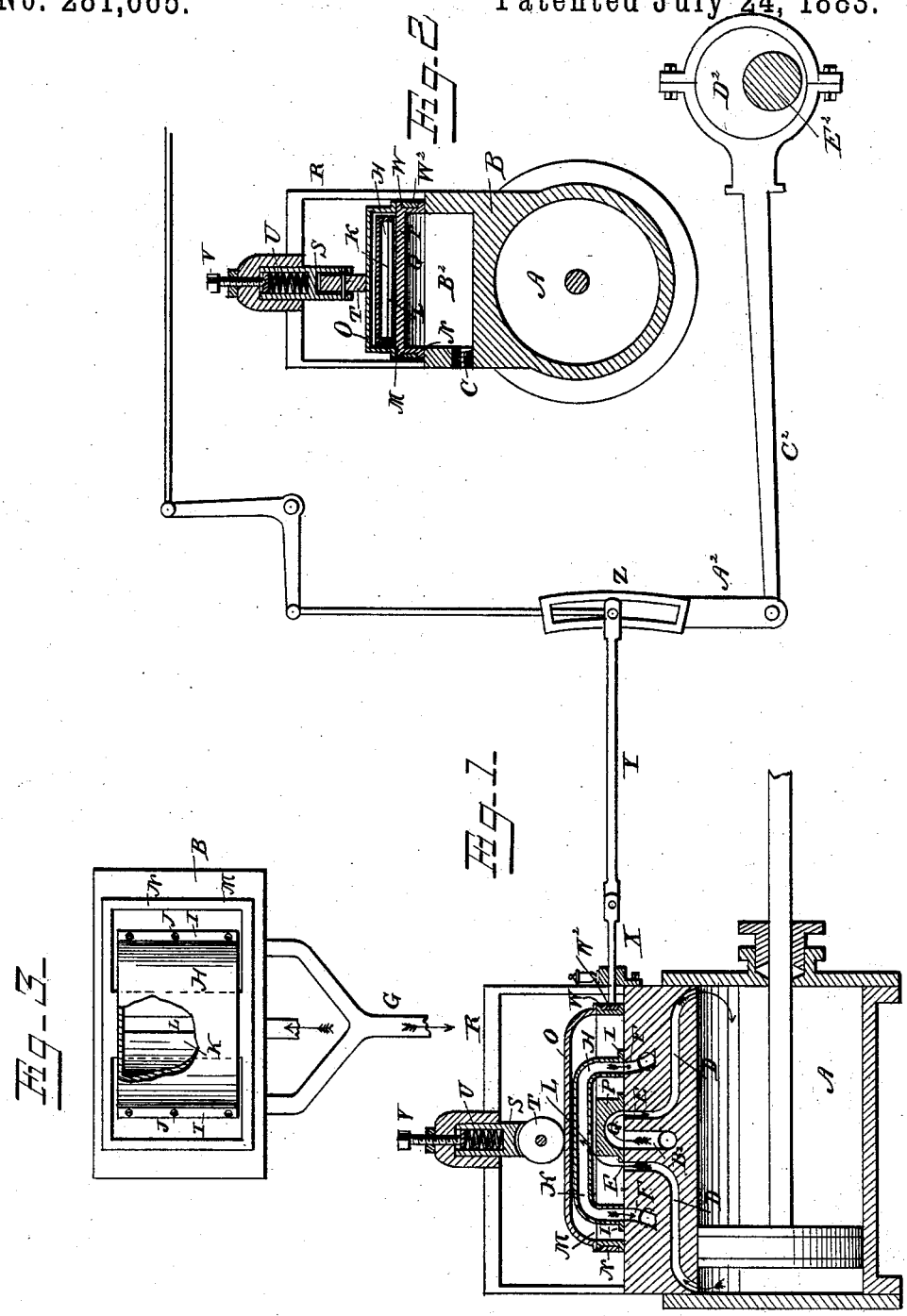
WITNESSES
F. L. Durand
J. R. Littell
INVENTOR
G. H. Burley
By C. A. Snow & Co.
Attorneys

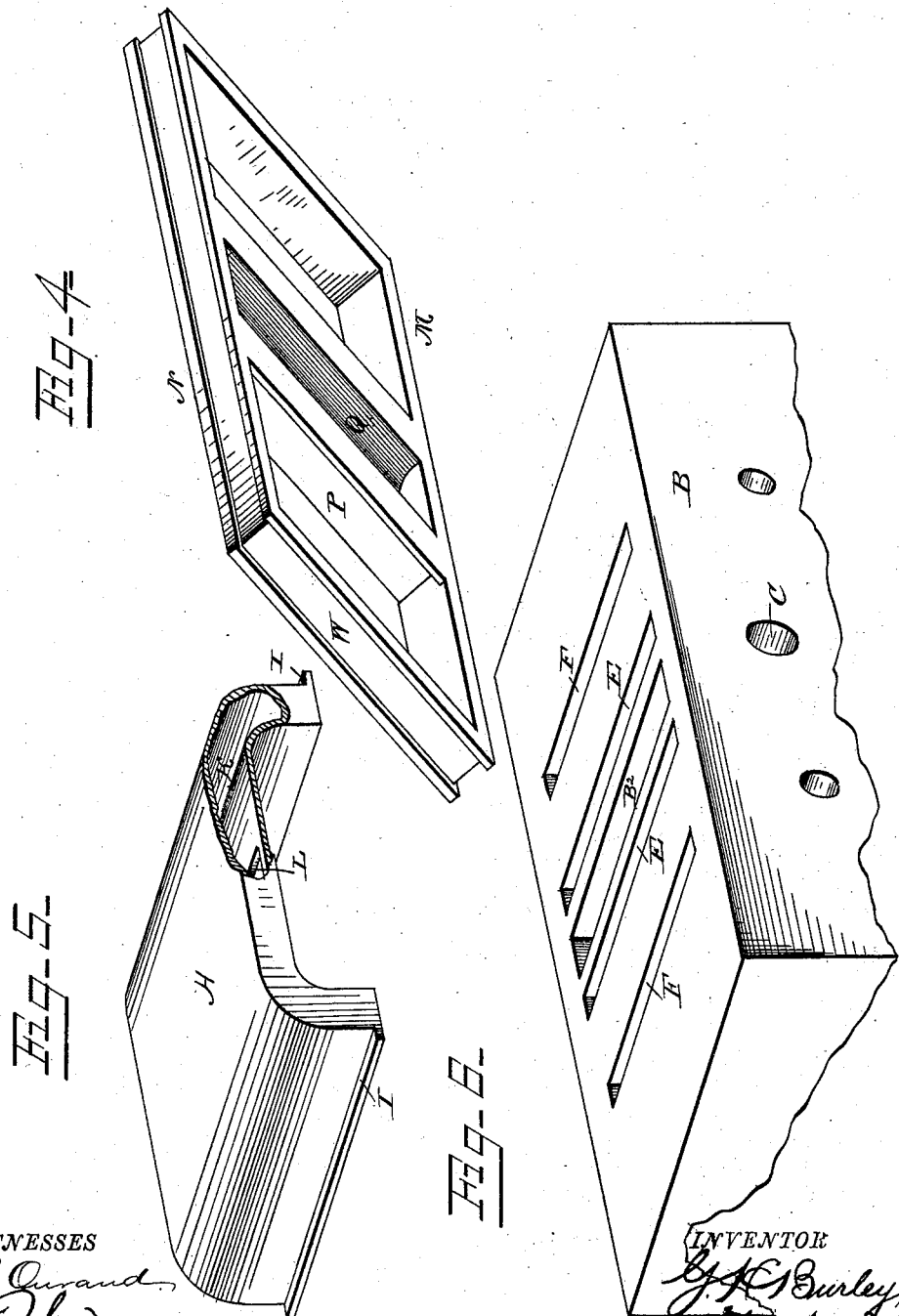

UNITED STATES PATENT OFFICE.

GEORGE H. BURLEY, OF TYRONE, PENNSYLVANIA.

VALVE FOR STEAM-ENGINES.

SPECIFICATION forming part of Letters Patent No. 281,665, dated July 24, 1883.

Application filed May 1, 1883. (No model.)

*To all whom it may concern:*

Be it known that I, GEORGE H. BURLEY, a citizen of the United States, residing at Tyrone, in the county of Blair and State of Pennsylvania, have invented a new and useful Valve for Steam-Engines, of which the following is a specification, reference being had to the accompanying drawings.

This invention relates to valves and valve-gear for steam-engines; and it consists in certain improvements in the construction of the same, which will be hereinafter fully described, and particularly pointed out in the claims.

In the drawings hereto annexed, Figure 1 is a longitudinal vertical sectional view of the valve, cylinder, and valve-gear. Fig. 2 is a vertical transverse sectional view. Fig. 3 is a plan view, the top of the valve-casing having been removed; and Figs. 4, 5, and 6 are detail views, in perspective, of parts of the invention.

The same letters refer to the same parts in all the figures.

A in the drawings designates the cylinder of a steam-engine, which is of the usual construction and provided with the valve-seat B. The latter is provided with a central transverse groove or recess, $B^2$, one end of which communicates with the pipe C, through which live steam is supplied to the engine.

D D are passages formed in the valve-seat, extending from the ends of the cylinder and terminating in the ports E E, closely beside the central recess, $B^2$. Two transverse grooves or recesses, F F, are formed beside the ports E, and said recesses F communicate with the exhaust-pipe G.

H is a shell or casing having flanges I at the ends to receive screws or bolts J, by which the said casing is secured to the valve-seat over the exhaust ports or recesses F. The said shell or casing has an arched passage, K, connecting the exhaust-ports F F with each other, and having an opening or port, L, in its under side, as shown.

M is the valve, which consists of a rectangular frame, N, having an arched cap or top, O, which is bolted or otherwise suitably secured to the said frame. The sides of the frame N are connected by a transverse bar, P, having a groove or recess, Q, in its under side, by which one of the ports E may be connected with the live-steam port or recess $B^2$. The transverse bar P passes under the arched shell or casing H, which may serve to limit the longitudinal movement of the sliding part of the valve, and which is in turn accommodated under the arched top O of the valve.

A suitable frame-work, R, constructed over the valve, is provided with bearings for a vertically-sliding socket, S, having a friction-roller, T, that bears against the top of the valve, thereby serving to keep the latter to its seat. The socket S contains a spring, U, the tension of which may be regulated by a set-screw, V, thereby regulating the pressure of the friction-roller upon the valve.

The sides of the frame N of the valve are provided with grooves W, in which is seated a rectangular yoke, $W^2$, the front end of which has the valve-stem X. The latter is connected, in the usual manner, by a pitman, Y, with a link, Z, operated by a crank, $A^2$, connected by a rod, $C^2$, with the eccentric $D^2$ upon the main shaft $E^2$. Suitable means are employed for adjusting the pitman Y in link Z, so as to regulate the length of throw of the valve.

From the foregoing description, taken in connection with the drawings hereto annexed, the operation and advantages of my invention will be readily understood. A stationary valve-chest is dispensed with, thereby rendering the valve and its seat easily accessible for cleaning and other purposes. The construction is simple, and the operation efficient.

I claim as my invention and desire to secure by Letters Patent in the United States—

1. The valve-seat having passages connecting with the ends of the cylinder, a central transverse recess communicating with the live-steam pipe, and transverse recesses communicating with the exhaust-pipe, in combination with an arched casing having a passage connecting the exhaust ports or recesses, and having an opening in its under side, as set forth.

2. The combination, with the valve-seat having the steam-entrance $B^2$, passages D, having ports E, and exhaust-ports F, connected by a passage through an arched casing having opening L, of the slide-valve consisting, essentially, of a shell or casing having a transverse bar provided with a recess in its under side, adapted to connect the steam-entrance with one of the ports E of passages D, as set forth.

3. The combination, with the valve-seat having the stationary arched casing provided with the exhaust-passage, as described, of the slide-valve consisting, essentially, of a shell having a transverse bar provided with a steam-passage, a suitable frame-work surrounding the said valve, the vertically-sliding socket having a friction-roller adapted to bear against the valve, and a tension-spring, and a set-screw arranged to regulate the tension of said spring, as set forth.

4. The described slide-valve, consisting, essentially, of a shell or casing comprising a rectangular frame and an arched top or cap, and having a transverse bar provided with a steam-passage, in combination with a yoke adjusted upon the rectangular frame, a stem extending from said yoke, and suitable operating mechanism, as set forth.

5. The combination of the valve-seat having the arched shell provided with the exhaust-passage, the slide-valve consisting of an arched shell having a transverse bar provided with the steam-passage, the friction-roller, and means for pressing the same against the arched shell of the slide-valve with controllable pressure, the yoke encircling the sliding part of the valve and having a valve-stem, and suitable operating mechanism, substantially as described.

In testimony that I claim the foregoing as my own I have hereto affixed my signature in presence of two witnesses.

GEORGE HARVEY BURLEY.

Witnesses:
GEO. W. HARDER,
JAMES M. HANSCOM.